US008495255B2

(12) United States Patent
Butler et al.

(10) Patent No.: US 8,495,255 B2
(45) Date of Patent: Jul. 23, 2013

(54) DISCOVERY AND CONFIGURATION OF DEVICE CONFIGURATIONS

(75) Inventors: Tracy D. Butler, Wappingers Falls, NY (US); Scott B. Compton, Hyde Park, NY (US); Patricia G. Driever, Poughkeepsie, NY (US); Ilene A. Goldman, Poughkeepsie, NY (US); Craig D. Norberg, Wappingers Falls, NY (US); Dale F. Riedy, Poughkeepsie, NY (US); Matthew H. Sabins, Poughkeepsie, NY (US); Michael J. Shannon, Wappingers Falls, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/458,193

(22) Filed: Apr. 27, 2012

(65) Prior Publication Data
US 2012/0215946 A1    Aug. 23, 2012

Related U.S. Application Data

(63) Continuation of application No. 12/822,835, filed on Jun. 24, 2010, now Pat. No. 8,244,924.

(51) Int. Cl.
*G06F 3/00* (2006.01)
(52) U.S. Cl.
USPC ............. 710/8; 710/38; 709/220; 709/221; 709/228; 713/1; 713/2
(58) Field of Classification Search
None
See application file for complete search history.

(56) References Cited

U.S. PATENT DOCUMENTS

| | | | |
|---|---|---|---|
| 5,301,323 A | 4/1994 | Maeurer et al. | 718/105 |
| 5,572,694 A * | 11/1996 | Uchino | 718/1 |
| 6,240,467 B1 * | 5/2001 | Beardsley et al. | 710/5 |
| 6,330,585 B1 | 12/2001 | Casper et al. | 709/200 |
| 6,636,499 B1 | 10/2003 | Dowling | 370/338 |
| 6,687,766 B1 * | 2/2004 | Casper et al. | 710/20 |
| 6,748,557 B1 | 6/2004 | Beardsley et al. | 714/43 |
| 6,859,439 B1 | 2/2005 | Driever et al. | 370/251 |
| 6,876,643 B1 | 4/2005 | Aggarwal et al. | 370/338 |

(Continued)

OTHER PUBLICATIONS

Fiber Channel Storage Area Network Discovery, 'Revision 3.5, Sep. 10, 1999, Brocade Communications Systems, Inc.

(Continued)

*Primary Examiner* — Steven Snyder
(74) *Attorney, Agent, or Firm* — Cantor Colburn LLP; William A. Kinnaman, Jr.

(57) ABSTRACT

A computer program product is provided for performing a method comprising: receiving, by the host processor, physical configuration information including identification of a location of each physical endpoint connected to the host processor and a plurality of communication paths associated with each physical endpoint; sending at least one message to each physical endpoint on each of the plurality of communication paths in response to receiving the physical configuration information, the at least one message requesting identification of a logical entity at the endpoint, and receiving logical configuration information identifying the logical entity; and generating a data collection accessible by the host processor, the data collection including the physical configuration information and the logical configuration information for each logical entity, and identification of a location of each physical endpoint connected to the host processor and a plurality of communication paths to each logical entity.

21 Claims, 5 Drawing Sheets

U.S. PATENT DOCUMENTS

| | | | |
|---|---|---|---|
| 6,996,638 B2 * | 2/2006 | Brice et al. | 710/36 |
| 7,127,599 B2 * | 10/2006 | Brice et al. | 713/1 |
| 7,130,938 B2 * | 10/2006 | Brice et al. | 710/62 |
| 7,174,550 B2 * | 2/2007 | Brice et al. | 718/1 |
| 7,177,961 B2 * | 2/2007 | Brice et al. | 710/36 |
| 7,290,070 B2 * | 10/2007 | Brice et al. | 710/37 |
| 7,554,959 B1 | 6/2009 | Dowling | 370/338 |
| 7,568,052 B1 | 7/2009 | Cwiakala et al. | 710/8 |
| 7,587,531 B2 * | 9/2009 | Brice et al. | 710/37 |
| 7,653,769 B2 | 1/2010 | Fisher et al. | 710/104 |
| 7,676,623 B2 | 3/2010 | Fisher et al. | 710/313 |
| 7,685,361 B2 | 3/2010 | Nashimoto et al. | 711/114 |
| 8,004,984 B2 * | 8/2011 | Shimizu et al. | 370/232 |
| 8,041,987 B2 * | 10/2011 | Allen et al. | 714/5.11 |
| 8,244,924 B2 * | 8/2012 | Butler et al. | 710/8 |
| 2003/0002492 A1 | 1/2003 | Gallagher et al. | 37/360 |
| 2004/0024759 A1 | 2/2004 | Dugan et al. | 707/4 |
| 2004/0054785 A1 * | 3/2004 | Driever et al. | 709/228 |
| 2004/0230783 A1 | 11/2004 | Brice et al. | 713/1 |
| 2005/0018696 A1 | 1/2005 | Henry | 370/401 |
| 2006/0107012 A1 | 5/2006 | Coronado et al. | 711/170 |
| 2007/0043476 A1 | 2/2007 | Richards et al. | 700/276 |
| 2007/0174851 A1 | 7/2007 | Smart | 719/324 |
| 2008/0215741 A1 | 9/2008 | Bayus et al. | 709/228 |
| 2010/0122111 A1 * | 5/2010 | Allen et al. | 714/3 |

OTHER PUBLICATIONS

Ikebe, H. et al. "New Architecture of Realizing Seamless Connectivity and Cooperative Control for Home Network Systems," Internatioanl Symposium on Circuits and Systems, 2005, May 2005, pp. 5341-5344, vol. 5, IEEE.

Kumar, A. et al., "Performance of Network Formation and Scheduling Algorirthms in the Bluetooth Wireless Ad-hoc Network," Journal of High Speed Networkd, Jan. 2001, pp. 59-76, vol. 10, No. 1, IOS Press.

Node Descriptor (ND) Support for the Message Processor section of IBM's z/VM V5R4.0 Information Center, Copyright IBM Corporation 2008.

Okada, Kouji et al., "Protocol Design for All-IP Computer Architecture," International Conference on Information Networking, Jan. 23-25, 2008, pp. 1-5, IEEE.

* cited by examiner

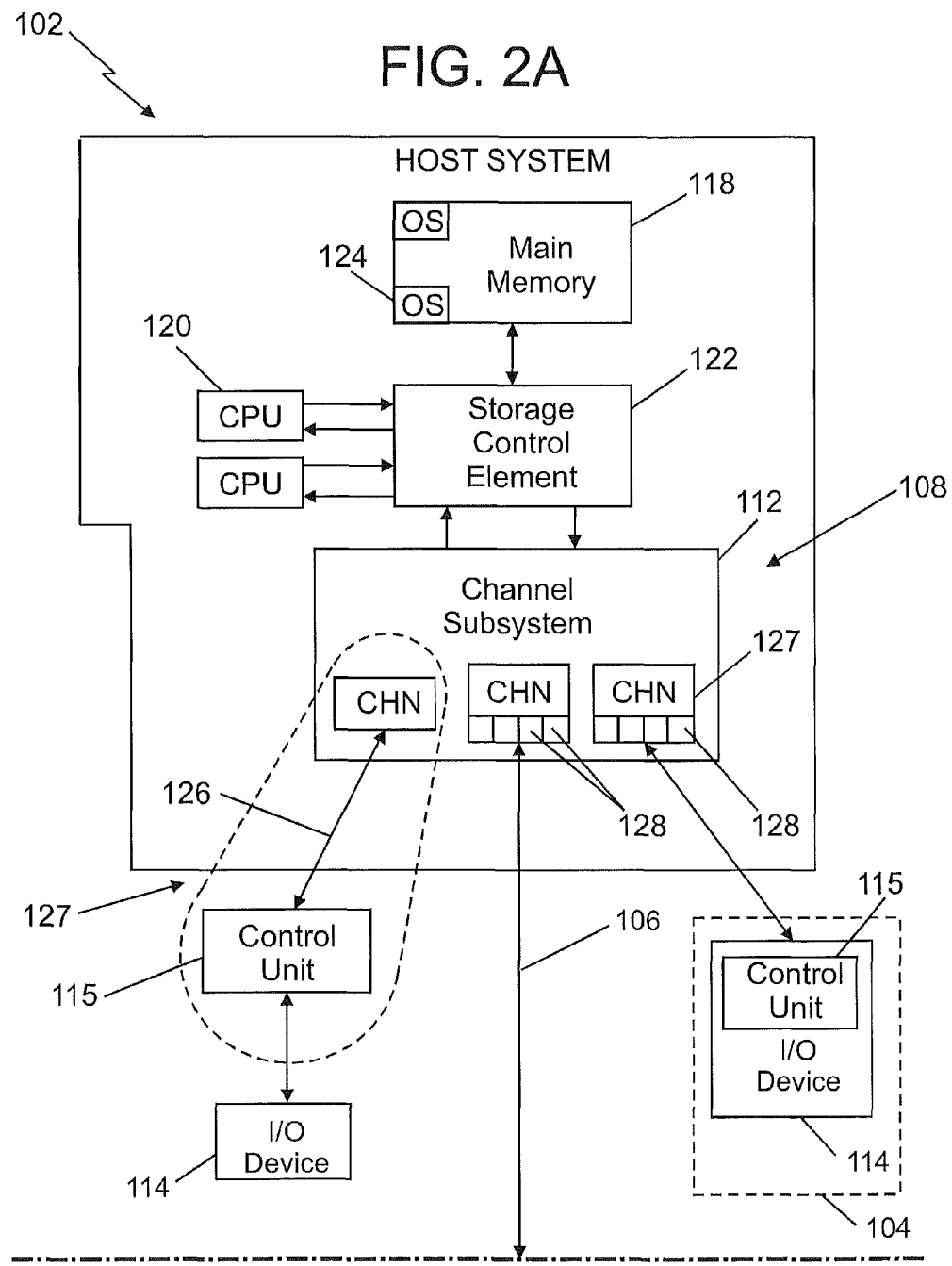

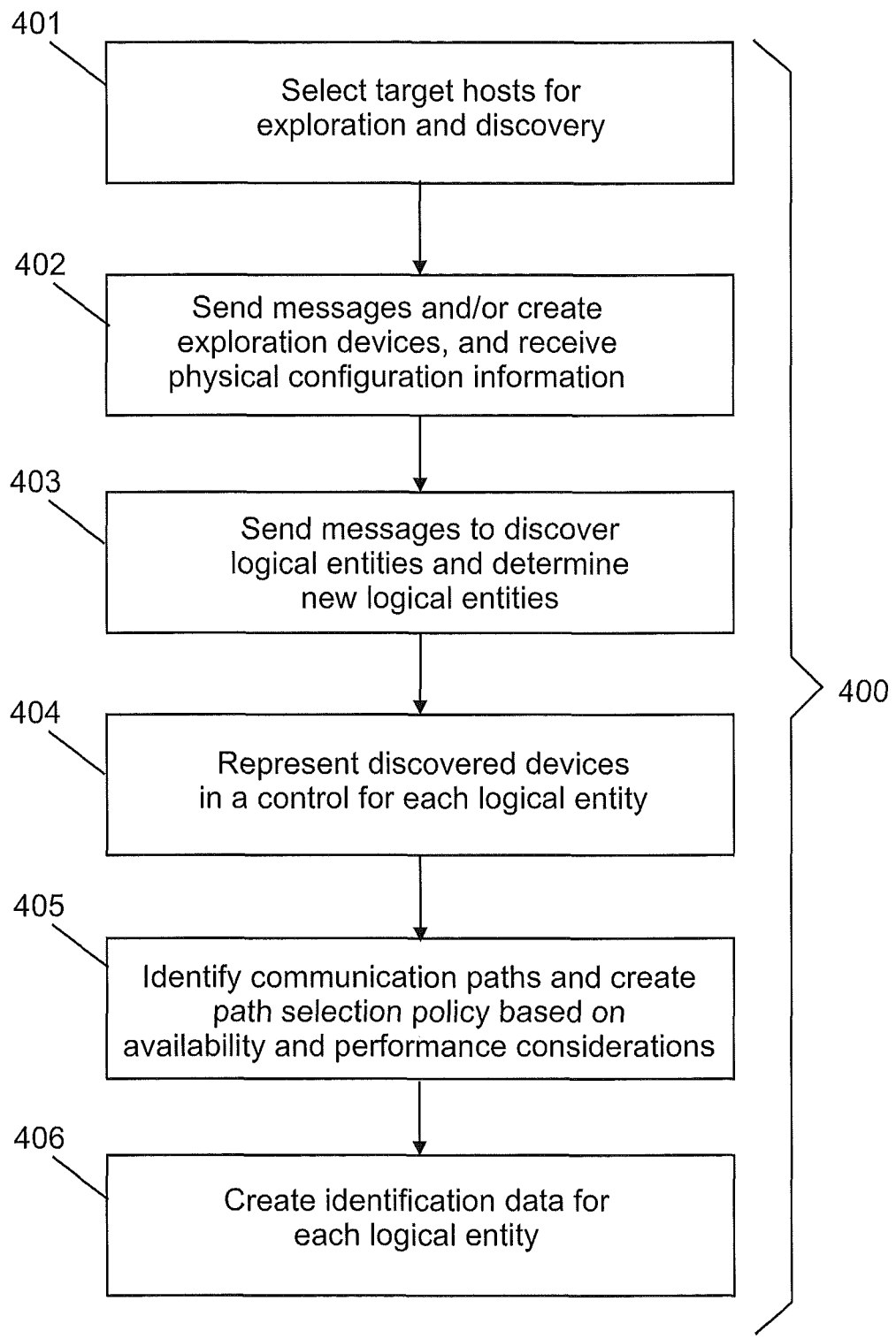

DISCOVERY AND CONFIGURATION OF DEVICE CONFIGURATIONS

CROSS-REFERENCE TO RELATED APPLICATIONS

This application is a continuation of co-pending U.S. patent application Ser. No. 12/822,835, filed Jun. 24, 2010, entitled "Discovery and Configuration of Device Configurations," which is hereby incorporated herein by reference in its entirety.

BACKGROUND

The present invention relates to computer memory and, more specifically, to discovery of the configuration of devices located at endpoints of storage area networks and endpoints directly attached to controllers.

Managing the configuration of devices and control units in a clustered environment is a daunting task and is typically performed by highly skilled personnel with vast experience. Whenever changes to the environment are required, care must be taken to ensure that new devices and control units are connected and configured properly. Even the skilled and experienced personnel can easily make mistakes due to the complexity of the environment. These mistakes include selecting paths that may not reach the proper device, selecting paths in such a way that could lead to loss of connectivity if one common component of the set of paths chosen fails, or selecting paths that over commit the available bandwidth for the workload that will run on those paths across all storage subsystems.

SUMMARY

An embodiment is a computer program product for processing communications between a host processor and a plurality of devices connected to the host processor by an input/output processing system, comprising a tangible storage medium readable by a processing circuit and storing instructions for execution by the processing circuit for performing a method comprising: receiving, by the host processor, physical configuration information including identification of a location of each physical endpoint connected to the host processor and a plurality of communication paths associated with each physical endpoint; sending at least one message to each physical endpoint on each of the plurality of communication paths in response to receiving the physical configuration information, the second message requesting identification of a logical entity at the endpoint, and receiving logical configuration information identifying the logical entity; and generating a data collection accessible by the host processor, the data collection including the physical configuration information and the logical configuration information for each logical entity, and identification of a location of each physical endpoint connected to the host processor and a plurality of communication paths to each logical entity.

Another embodiment is a method of processing communications between a host computer and a plurality of devices connected to the host computer by an input/output processing system, the method comprising: receiving, by the host processor, physical configuration information including identification of a location and a plurality of communication paths associated with each physical endpoint; sending at least one message to each physical endpoint on each of the plurality of communication paths in response to receiving the physical configuration information, the at least one message requesting identification of a logical entity at the endpoint, and receiving logical configuration information identifying the logical entity; and generating a data collection accessible by the host processor, the data collection including the physical configuration information and the logical configuration information for each logical entity, and identification of the plurality of communication paths to each logical entity.

A further embodiment includes a computer program product for processing communications between a host processor and a plurality of devices connected to the host processor by a network, comprising a tangible storage medium readable by a processing circuit and storing instructions for execution by the processing circuit for performing a method comprising: generating an exploration device by configuring at least one of hardware and software in the host processor, the exploration device configured to be used to communicate with one of a plurality of physical endpoints in the network; responsive to a connection between the host processor and the plurality of devices being a network connection, sending a first Fibre Channel message from a channel subsystem in the host computer to a network processor requesting a configuration of the plurality of physical endpoints; receiving physical configuration information from the network processor in response to the first message, the physical configuration information including identification of a location and a plurality of channel paths associated with each I/O device; sending a second Fibre Channel message to one or more I/O devices on each of the plurality of channel paths in response to receiving the physical configuration information, the second Fibre Channel message requesting identification of a logical image connected to the plurality of channel paths, and receiving logical image information identifying the logical control unit; and generating a data collection accessible by the host computer, the data collection including the physical configuration information and the logical information for each channel path, and identification of the plurality of channel paths to each logical control unit.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 is a flow diagram depicting an exemplary embodiment of a method of updating a network configuration and/or managing communications in a computer network.

DETAILED DESCRIPTION

The systems and methods described herein include an automatic process for making incremental updates to a running operating system or cluster of operating systems. These incremental updates are for the dynamic discovery of physical and logical I/O device entities, such as newly connected or changed storage subsystems, control units and I/O devices connected to one or more host computers in a cluster, and connected to the devices via point-to-point and/or network fabric connections. These resources that are dynamically discovered are placed into an I/O configuration definition having optimal high availability characteristics (to allow single points of failure to be avoided) and allowing for a client based policy for controlling performance goals (e.g. number of managed channels). The I/O resources are discovered and assigned using messages such as existing, well-known I/O commands and new I/O commands (e.g. Test Initialization Capability (TINC) commands). The fabric is explored through each attached channel or other communication path on each node in the cluster to determine all of the device entities, such as physical or logical control units and I/O devices, to which a logical path can be established. Each device entity is discovered by interrogating and exploring the network nodes to discover all physical endpoints, such as destination ports, followed by utilizing commands configured to interrogate each endpoint via each available channel or path to receive configuration data for each logical device entity. In one embodiment, the hardware and/or software of the host computer is dynamically configured to generate an exploration device used to deliver interrogation I/O messages to each endpoint and generate configuration data for logical control units (control unit images) and other logical device entities. The configuration data may be used to update existing device configurations and/or may be used to manage I/O operations by selecting paths based on availability and performance considerations.

Figure 1:
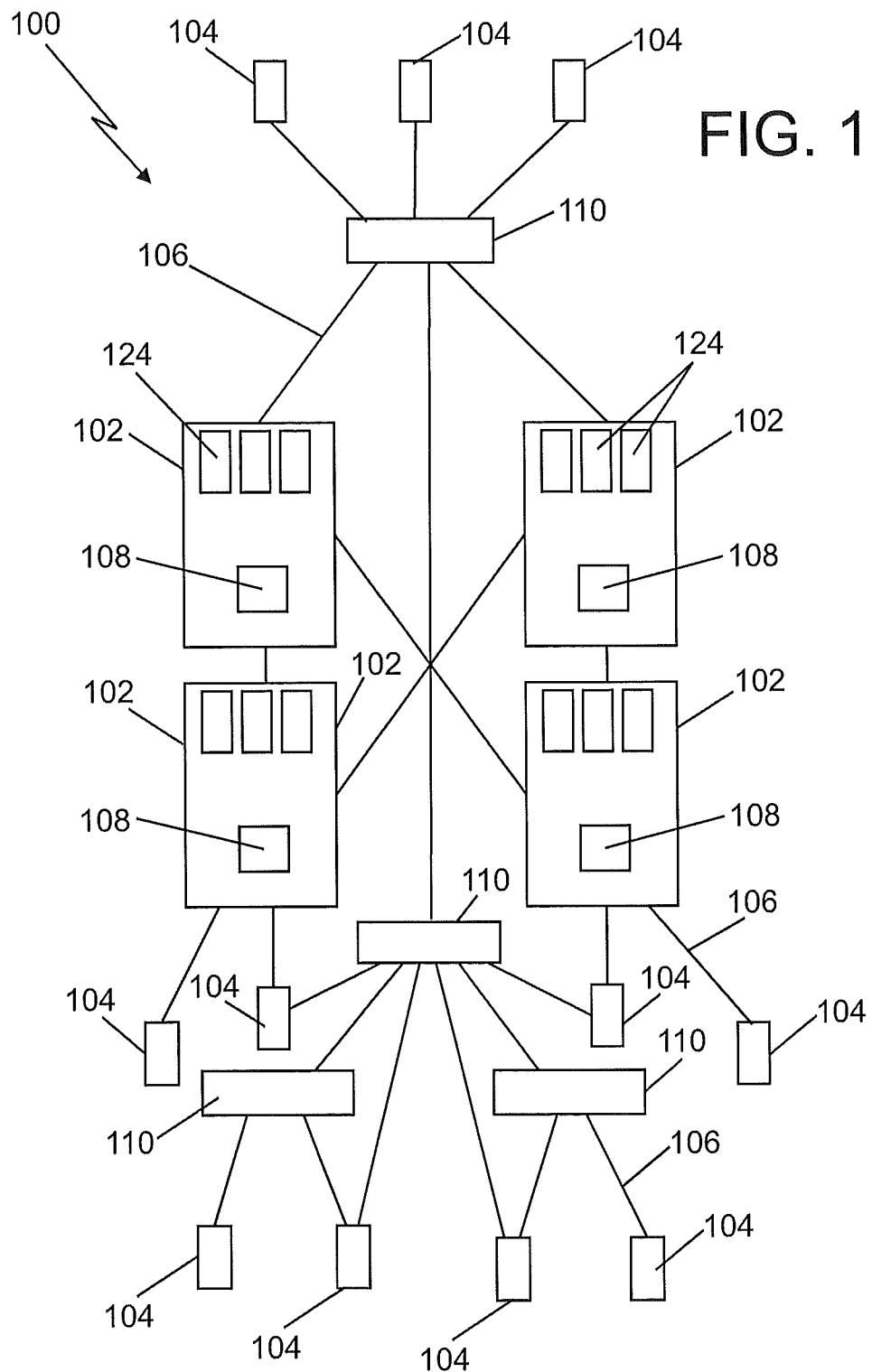
FIG. 1 depicts an exemplary embodiment of a computer network and/or cluster.

FIG. 1 illustrates an exemplary embodiment of a computing, processing and/or data management system 100 such as a storage area network or fabric. The system 100 includes one or more host processors 102 connected to a plurality of device entities represented as nodes 104. The host processor 102 may be any computer or processing and/or storage device, such as a server, storage unit, data center and device management unit. The host processor 102 may be a large scale computing system, such as a mainframe or server. The nodes 104 may be connected in communication with the host processors 102 via suitable connectors 106 such as wires, cables and optical fibers, as part of, for example, a Fibre Channel (FC) or Internet Protocol (IP) network. Each node 104 may include one or more I/O devices such as disk controllers, tape controllers, card readers and punches, magnetic tape units, direct access storage devices, displays, keyboards, printers, pointing devices, teleprocessing devices, communication controllers and sensor based equipment, to name a few.

Each host processor 102 includes an I/O processing system 108 configured to facilitate communication between the host processors 102 and the nodes 104. In one embodiment, the system 100 includes one or more network processors such as name servers, network switches and/or Fibre Channel switches 110. Each switch 110 is coupled to an I/O processing system 108 and one or more nodes 104 and provides the capability of physically interconnecting any two links that are attached to the switch 110. The network processor may include a database or other structure storing network configuration information for each physical endpoint of the network, such as identifiers, fabric addresses and zoning procedures.

In one embodiment, the host processor(s) 102 are configured as a system complex or "sysplex" that includes multiple processors such as servers or mainframes connected as a single logical system. In one example, the host processor 102 is a parallel or other sysplex that act as a single system image with an operating system. The sysplex may include dedicated hardware and/or virtual images executing under the control of a hypervisor or a PR/SM (Processor Resource/System Manager). For example, one or more of the host processors 102 include operating systems 124 that may be partitioned into one or more images or logical partitions (LPARs), and multiple physical and/or logical (e.g., LPARs) host computers may be connected in the cluster or sysplex.

DETAILED DESCRIPTION

Figure 2B:
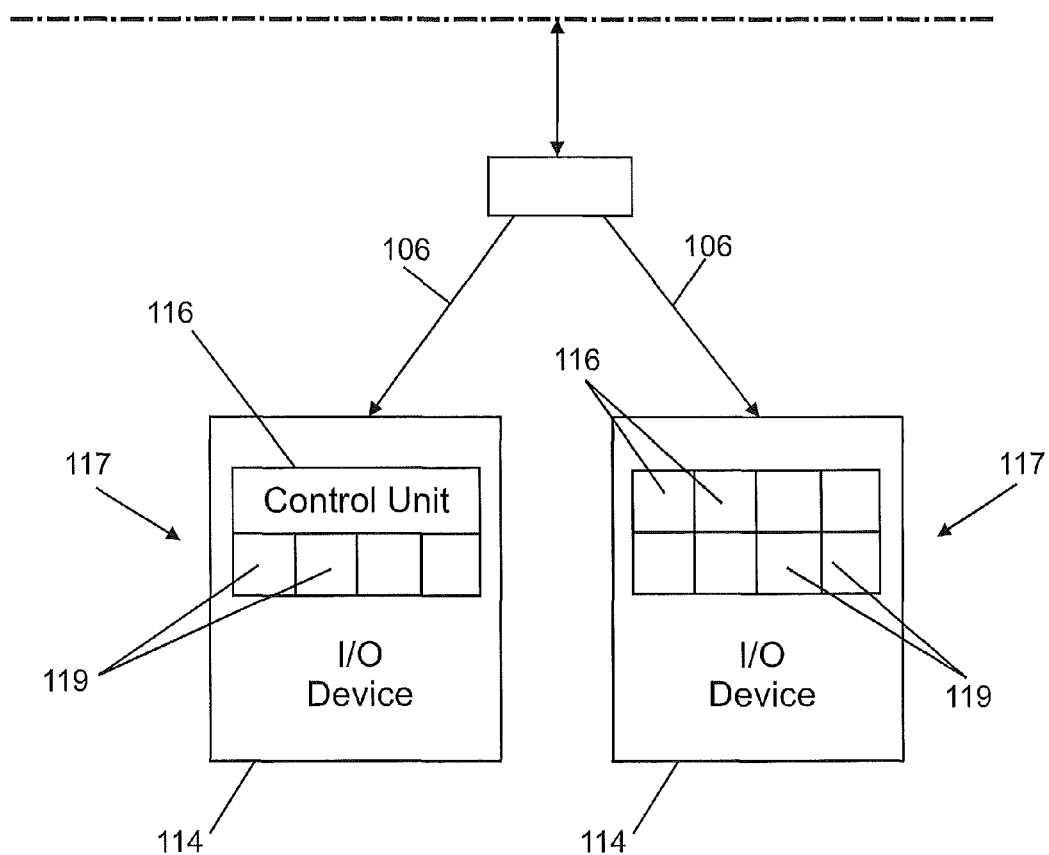
FIG. 2 depicts an exemplary embodiment of a host computer system including an input/output processing system.
Figure 2:
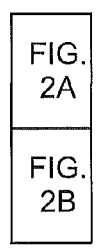

FIG. 2 illustrates an example of an I/O processing system 108 included in a host processor 102. In this embodiment, the I/O processing system 108 includes a channel subsystem 112, and each node 104 includes an I/O device 114, one or more optional physical control units 115, and can include one or more logical entities 117 such as logical control units 116 which may be associated with one or more logical devices or device images 119. The logical entities 117 may be any non-physical device incorporated in or associated with the device 114, destination port or node 104, including any storage or memory area, logical volume, or image.

The host processor 102 includes, for example, a main memory 118, one or more processors such as central processing units (CPUs) 120, a storage control element 122, and the channel subsystem 112. The I/O processing system 108 is connected via the network with one or more storage subsystems such as control units 116 associated with one or more control unit images 116 and logical I/O devices 114. The control units and control unit images may be connected to the I/O processing system 108 via direct, point-to-point connections or fabric connections. The control units may be configured as physical control units 115 connected to or otherwise incorporated into the devices 114. The control units may also be logical control units 116 or virtual images associated with one or more devices 114 and/or logical devices 119.

Main memory 118 stores data and programs, which can be input from I/O devices 114. For example, the main memory 118 may include one or more operating systems (OSs) 124 (which may be configured as one or more logical partitions (LPAR)) that are executed by one or more of the CPUs 120. For example, one CPU 120 can execute a Linux™ operating system 124 and a z/OS™ operating system 124 as different virtual machine instances. The main memory 118 is directly addressable and provides for high-speed processing of data by the CPUs 120 and the channel subsystem 112.

One or more of the above components of the network 100 are further described in "IBM® z/Architecture Principles of Operation," Publication No. SA22-7832-05, 6th Edition, April 2007; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

CPU 120 (or one or more LPARs) is the controlling center of the I/O processing system 108. It contains sequencing and processing facilities for instruction execution, interruption action, timing functions, initial program loading, and other machine-related functions. Storage control element 122 is coupled to the main memory 118, the CPUs 120 and the channel subsystem 112, and controls, for example, queuing and execution of requests made by the CPU 120 and channel subsystem 112.

The channel subsystem 112 provides a communication interface between host system 102, switches 110 and endpoints such as physical and/or logical control units. The channel subsystem 112 is coupled to the storage control element 122, as described above, and to each of the control units 116 via a connection 126, such as a serial link. The connection 126 may be implemented as an optical link, employing single-mode or multi-mode waveguides in a Fibre Channel fabric. The channel subsystem 112 directs the flow of information between I/O devices 114 and main memory 118. It relieves the CPUs 120 of the task of communicating directly with the I/O devices 114 and permits data processing to proceed concurrently with I/O processing.

Each node 104, endpoint or device 114 may be associated with one or more logical entities or virtual images such as one or more logical control units 116. Each logical control unit 116 provides logic to operate and control one or more I/O devices 114 and adapts, through the use of common facilities, the characteristics of each I/O device 114 to the link interface provided by the channel 127. The common facilities provide for the execution of I/O operations, indications concerning the status of the I/O device 114 and control unit 116, control of the timing of data transfers over the channel paths 127 and certain levels of I/O device 114 control.

In one embodiment, the logical control units 116 control the operation of one or more input/output devices 114. In another embodiment, the logical control units 116 control access to logical devices 119 or memory ranges in a storage device 114. The logical control units 116 may be located within or outside of the physical device 114 or physical control unit.

The channel subsystem 112 uses one or more communication paths, such as channel paths 127 (or I/O channels) as the communication links in managing the flow of information to or from the I/O devices 114 and/or the control units 116. The channel paths 127 (i.e., channels) may include any combination of communication devices (such as connections 126 or connectors 106 and/or switches 110) that form a logical path through which data is transferred between network components, such as between the channel subsystem 112 and a node, device or logical control unit 116). Channels 127 may be connected by optical fiber, wireless and/or cable subsystem that connect components as well as switching devices. Subchannels 128 (hardware representations of the device 114) may be associated with each control unit 115, 116 and/or device 114 and serve to represent the device 114. For example, a control unit 115 is associated with a set of up to 8 channels 127 and may have up to 256 subchannels associated with logical control units 116.

As a part of the I/O processing, the channel subsystem 112 also performs the path-management functions of testing for channel path availability, selecting an available channel path (channel 127 or subchannel 128) associated with an I/O device and initiating execution of the operation with the I/O device 114 for the existing I/O configuration definition.

In one embodiment, one or more subchannels 128 are provided for each endpoint or node 104 accessible to a program through the channel subsystem 112. Each subchannel 128 may provide (via, for example, a data structure, such as a table) the logical appearance of a device (or a logical control unit 116) to the host processor 102. Each subchannel 128 provides information concerning the associated I/O device and its attachment to the channel subsystem 108. The subchannel 128 also provides information concerning the state of I/O operations and other functions involving the associated I/O device 114. The subchannel is the means by which channel subsystem 112 provides information about associated I/O devices 114 to CPUs 120, which obtains this information by executing I/O instructions received from, for example, the O/S 124. Each subchannel 128 is associated with a logical control unit 116 that is associated with one or more paths or channels 127.

Figure 3:
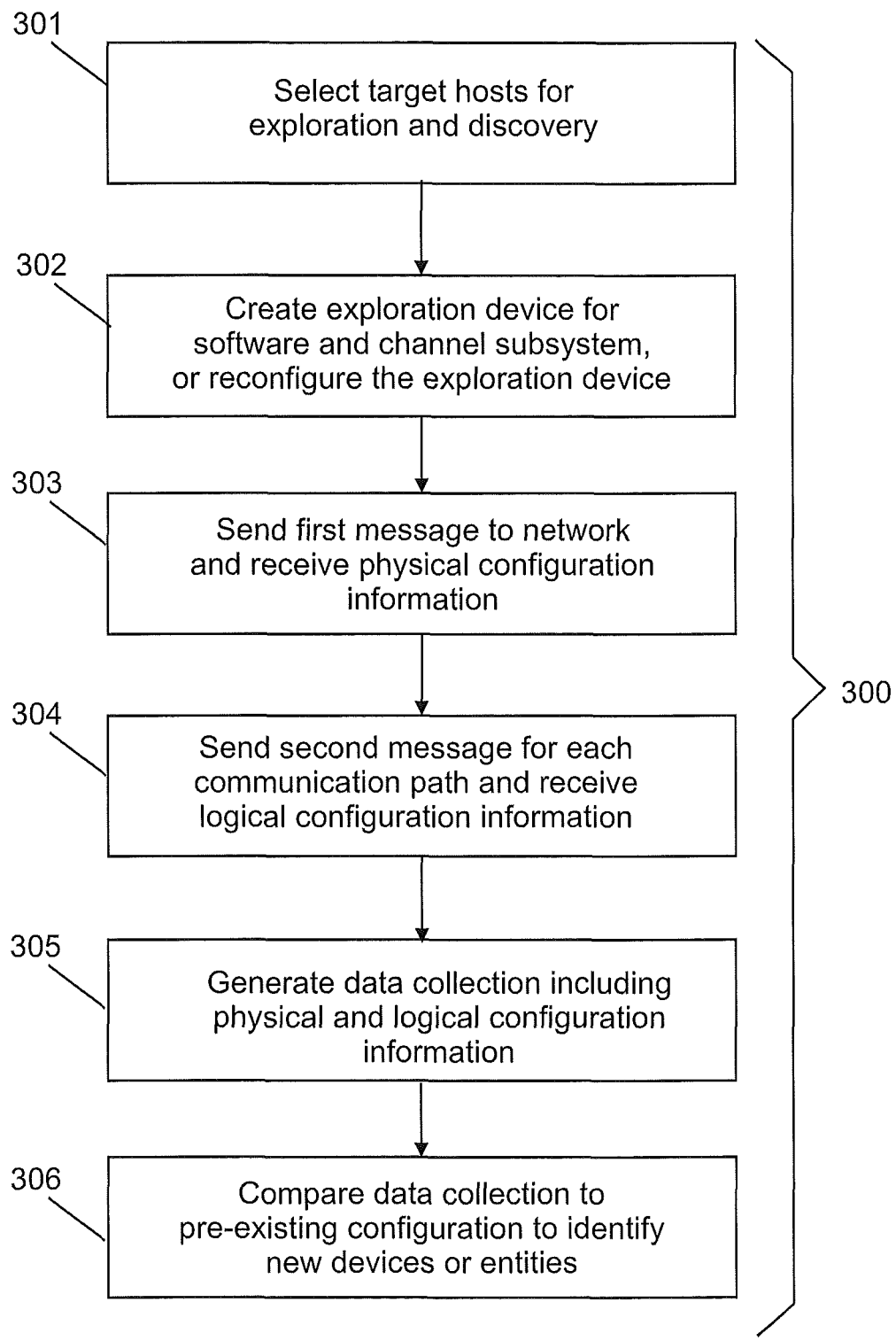
FIG. 3 is a flow diagram depicting an exemplary embodiment of a method of exploring and discovering devices in a network and/or generating a network device entity configuration.

FIG. 3 illustrates a method 300 of discovering devices in a network and/or generating a network device entity configuration. The method 300 includes one or more stages 301-306. Although the method 300 is described in conjunction with the host computer system or processor 102 and the channel subsystem 112, the method 300 can be utilized in conjunction with any processing and/or storage devices capable of I/O operations with remote devices, as well as with any network device or system. The method can be performed by one or more host processors 102, such as one or more host processors 102 or other processing or control entities in a cluster.

In the first stage 301, for a system or network 100 that includes multiple host entities or processors 102, such as host processing systems or computers in a cluster or sysplex, a target list of host processors 102 within the cluster is selected. For example, one or more host processors 102, LPARs, clusters or network segments are selected to be used for exploration. The selection may include determining which entities will be used, whether the entities 102 are capable of exploration, and also what channels 127 will be explored for each target host. The selection may also include determining what entities are capable of making dynamic I/O configuration changes to facilitate exploration.

In the second stage 302, one or more exploration devices are dynamically created and configured for use to deliver I/O commands and/or other messages to various nodes and logical devices in the cluster. The exploration device is created and associated with a selected network path (such as a channel 127) and an endpoint address. The exploration device(s) are dynamically configured on each target host or host processor 102. In one embodiment, the exploration device is assigned an address based on the network's pre-existing naming protocol. The exploration device may be generated or reconfigured for each channel 127 or other communication path for each endpoint. This is performed for each target host or system identified in stage 301.

An exploration device includes any O/S and/or hardware configuration that is added to hardware or software and used to establish a connection with an endpoint via a selected channel 127 or other communication path, and which can represent an endpoint to the host computer system 102. In one embodiment, the exploration device is any configuration added to software, the O/S and/or hardware. The configuration can be dynamically changed to create an exploration device for each channel 127 as needed.

An example of a exploration device is a memory structure such as a control block. An example of a control block is a unit control block (UCB) configured in the host computer that can describe any single device or endpoint to the O/S. The UCB may include various data describing an endpoint, such as an address, an identifier (e.g., device number) and one or more communication path identifiers (e.g., channel number). The UCB may be used by, for example, the O/S 124 to send messages to a selected endpoint.

In the third stage 303, a physical configuration of various endpoints connected to the host processor 102 (or cluster) is determined. The physical configuration may include a configuration of point-to-point devices and/or fabric devices, such as physical controllers 115 and/or I/O devices 114 at each endpoint. For example, in point-to-point configurations, one channel may be connected to one endpoint, and in fabric connections, one channel may be connected to a switch or network processor that is connected to a plurality of endpoints. In this stage, the host processor 102 receives physical configuration information including identification of a location and at least one communication path or channel 127 associated with each physical endpoint.

In one embodiment, if the host processor 102 and the endpoints are connected via a network or fabric, a first message is sent to each network processor 110 over each I/O channel 127 that is connected to the fabric to determine all of the destination ports or other physical endpoints such as physical controllers 115 that are available through each I/O channel 127. A message may be any type of signal or data transfer for communication between two components. Examples of messages include a data stream, frame, packet, signal, and one or more frames associated with one or more selected operations. In one embodiment, sending the first message includes iteratively sending a message over each channel 127 to the fabric. In one embodiment, sending each message includes connecting an exploration device (e.g., a UCB) assigned to a channel 127 and sending a message over the channel 127 to identify the I/O resources available to that channel as a destination port and/or physical I/O device. Each message is sent using an existing protocol, such as Fibre Channel (FC) commands defined in the standard by the INCITS Fibre Channel (T11) Technical Committee. In one example, a single subchannel 128 may be used to reach all endpoints to which a channel 127 can establish a logical path to.

In one embodiment, for each channel 127 having an exploration device connected thereto, a response message is received from the network processor 110 at selected network endpoints. The response message may include various physical configuration information that identifies the physical endpoints and may also provide other characteristic and/or topology information for the physical endpoints.

In one example, for each channel 127, host computer hardware and/or software is updated or configured by adding a control block to the O/S hardware (e.g., via microcoding) and software. The control block is assigned an unused control unit number, device number and a channel path identifier based on a selected or pre-existing naming protocol. The control block is dynamically connected to the channel 127 and a fibre channel (or other protocol) endpoint identification command or message is sent to the channel 127 to identify physical entities at the associated endpoint. An example of such a command is a Fibre Channel Generic Services (FC-GS) get port identifiers command (e.g., GID_FT), which may be sent as an information unit (IU) or frame via the channel 127 to a name server or other network processor 110. In one embodiment, if a GID_FT message is sent but is not successful, other commands such as a GA_NXT command (Get All Next) may be used. A command response may be returned by the network processor 110 (e.g., name server), providing port identification information, which can be used to update the exploration device.

For example, the channel subsystem 112 acts as an FCP Initiator N_Port and issues a Fibre Channel Generic Services (FC-GS) GID_FT to the discovery device, which then causes a command message (such as a channel command words (CCW)) to a name server (located for example in a switch 110) to get a list of N_Port Identifiers.

The list of port identifiers is returned by the name server via a response message (e.g., Accept CT_IU). The host processor 102 can limit selection to just those ports of a certain type, e.g. FICON.

In one example, the first message is a Fibre Channel Link Services (FC-LS) Request Node Identification (RNID) command. A RNID command may be used by the host processor 102 to request identification and/or configuration information from the control unit 116 or other logical device or entity at an endpoint of a given channel 127. The RNID is sent, in one example, by the OS 124. The host processor 102 may receive a response to the message, such as a RNID response, that provides the requested configuration information to the channel subsystem 112. The RNID data received via the RNID response includes, for example, a world wide unique physical identifier and includes information describing the endpoint (e.g., whether the endpoint is an I/O device such as a tape or disk, a destination port or a channel). In this stage, both switch-attached and direct attached nodes 104 are identified and physical configuration information is received.

In the fourth stage 304, the host processor 102 or channel subsystem 112 determines what (if any) logical entities, including logical control units 116, are connected to the selected channel 127. In one embodiment, this stage is performed to identify logical control units 116 or other logical entities such as logical devices 119 associated with each path and with the physical entities discovered in stage 303. In one embodiment, the host processor 102 or channel subsystem 112 may perform this stage for each channel 127, physical device and/or endpoint discovered in stage 303, or may only perform this stage for selected channels or devices. For example, the physical device and/or destination port information received in stage 303 may be outputted to a user to allow the user to select devices and/or channels for discovery of logical devices. Although this stage is described as performed to discover logical entities, it may also be performed to discover physical entities including hardware such as physical devices and/or control units.

One or more second messages are sent to each I/O channel 127, requesting identification of a logical device entity at the endpoint. In one embodiment, sending the second message includes iteratively sending a message to each channel 127 to reach all endpoints reachable from each channel 127. In one embodiment, using the exploration device (e.g., UCB) assigned to the channel 127, a device identification message is sent to the channel 127 to identify the connected logical device (e.g., logical control units 116 and logical devices 119 and request configuration information. Each message is sent using an existing protocol, such as Fibre Channel FC protocol. The logical device identification message is sent for each channel 127, including channels connected to a fabric and any channels 127 with direct attached nodes 104.

In one embodiment, the connected device is a logical control unit 116 associated with a physical controller 115, and the message requests logical configuration information to be sent from the logical controller, such as the type of device, device capacity, device status, a world wide unique device identifier and address information. An example of logical device identification messages is the Read Configuration Data (RCD) command, described in "ESA/390 Common I/O-Device Commands and Self Description", publication number SA22-7204-02, which is hereby incorporated herein by reference in its entirety. Logical device identification messages may include any device and/or protocol specific query commands (such as sense identification (sense ID) commands) for logical configuration information about logical control units and associated logical devices. In one embodiment, the logical identification messages include Fibre Channel (FC) commands that are issued to the exploration device, and I/O messages such as channel command words (CCWs) are issued to the endpoints. Examples of FC commands include FC-SB-4 (Fibre Channel—Single-Byte Command Code Sets—4), FC-GS (FC Generic Services) and FC-LS (FC Link services) commands.

An example of the second message is a Test Initialization Capability (TINC) command, which is a FC-SB-4 Link Control command. The TINC command may be used to gather information such as a control unit number identifying a logical control unit 116. For example, the TINC command may be used to receive a list of logical image information (logical control units) 116 in the node 104 associated with the endpoint. The TINC command is further described, for example, in U.S. application Ser. No. 12/821,250, filed on Jun. 23, 2010, which is hereby incorporated by reference in its entirety.

In one embodiment, the TINC command is used in combination with additional query commands to gather logical control unit information. For example, the TINC command is used to gather control unit numbers. If the TINC command is successful, additional device-specific query commands can be used to gather additional logical characteristics of the I/O device 114.

For example, the TINC includes an indication of the LPAR or host processor 102 requesting the logical image information. A TINC response may include identification of logical image information indicating each logical control unit 116 associated with the channel 127, such as a vector having a width equal to the number of possible logical control units 116 that may be formed in the physical device receiving the request. In one embodiment, the first vector has a width of 256 bits. The first vector represents the logical control units 116 at the endpoint that the LPAR has access to and that have been configured and addressable. The vector includes a bit for each logical control unit 116, which is filled with a one or zero depending on whether the logical control unit 116 corresponding to that bit is configured and addressable by the requesting image (e.g. LPAR). In some cases, not every logical control unit 116 is accessible by every requesting image. Stages 302-304 are repeated for each channel 127 or other communication path in the network or cluster and for each endpoint available to each channel 127, and an exploration device may be dynamically created for each channel 127. After all of the endpoints have been explored, the exploration device may then be disconnected from the channels 127.

The message protocols are not limited to those described herein, and may include any protocols sufficient to allow for interrogation of nodes and/or physical and logical devices in a network. Examples of message protocols include various Fibre Channel protocols such as FICON (Fibre Connectivity) protocols, as well as protocols supporting channel command words (CCW) channel programs and protocols supporting transport control word (TCW) channel programs, as described, for example, in U.S. Patent Publication No. US 2009/0210581 A1 entitled "Bi-directional Data Transfer Within a Single I/O Operation," which is hereby incorporated herein by reference in its entirety.

In the fifth stage 305, the physical and logical configuration information is stored as a data collection or list accessible by the host computer 102, which includes configuration information as well as channel path information for each physical device and/or logical device. In one embodiment, the physical configuration information is included in a list of all physical controllers 114, and may be consolidated into a master table for all nodes 104 for the systems or processors 102 in the cluster that participated in the method 300.

In one embodiment, the control unit 116 and device 114 configuration information is hardened such that the hardware components (e.g., processors, channel subsystems) know about them (e.g., through the creation of input/output configuration data set (IOCDS) definitions) and the software components (e.g., operating systems) know about them (e.g., via input/output configuration programs (IOCPs) for hardware, input/output definition files (IODFs) for software, and/or UCB creation).

In one embodiment, the data collection includes first a list, table or other collection for each endpoint and physical device (such as physical control units 115 and I/O devices 114). In addition, the data collection includes a second list, table or other collection of all logical control units 116 and logical device images 119 associated with the logical control units, as well as each path (e.g., channel 127) to the logical control units 116 and devices 119. In this way, multiple paths to each control unit and/or device image may be configured and available for use.

For example, the data collection includes a first master table of all nodes 104 discovered, including a representation of all establishable paths that can reach each node 104 from each host 102. The data collection also includes a second master table of all host processors 102 and their associated channels 127, including a list of each reachable endpoint.

In the sixth stage 306, the data collection, such as list of discovered logical control units 116 and devices 114, is compared against a pre-existing collection or list of previously configured control units 116 and devices 114 for the cluster of nodes. The pre-existing list may be a data collection produced from a prior method similar to method 300 or compiled by any other process. For example, for a z/OS, the pre-existing list may include a description of those devices and control units described in the IODF. In this way, all new (not previously configured) logical and physical entities may be identified, and may also be used to update the pre-existing list if desired.

FIG. 4 illustrates a method 400 of discovering logical control units and logical devices in a network and/or generating a network device entity configuration. The method 400 includes one or more stages 401-406. Although the method 400 is described in conjunction with the host computer system 102 and the channel subsystem 112, the method 400 can be utilized in conjunction with any processing and/or storage devices capable of I/O operations with remote devices, as well as with any network device or system.

This method 400 is provided to determine if new logical control units or other devices exist, or if new devices on previously configured control units exist. For new control units and/or devices, this method may perform automatic device and control unit numbering and path selection.

In the first stage 401, a number of host processors 102, clusters and/or other entities are selected to be used for controller discovery, and paths such as channels 127 are selected to reach each selected node 104. For example, one or more host processors 102, LPARs, clusters, network segments or other target hosts are selected to be used for exploration. This stage is performed similarly to stage 301.

In the second stage 402, messages are sent from the target hosts to each potential logical control unit on the destination hardware, and/or exploration devices are dynamically configured on at least one target host and connected (and subsequently disconnected), to receive physical configuration information. Existing devices can be used to send messages if they exist, or if none exist for a selected node or endpoint, an exploration device can be configured. In one embodiment, exploration devices are configured on one of the target hosts selected in 401, selecting one complete path (e.g., channel 127 and endpoint) discovered in the method 300 to reach the node 104. This process is repeated for each possible logical control unit.

In the third stage 403, I/O commands such as CCW commands or other messages are sent to each channel 127 using the target hosts to gather configuration information regarding each logical device, and the configuration information is consolidated and compared to a list of previously configured devices in the network or cluster, revealing a list of new control units and new devices that were not previously configured or connected to the network. This stage is performed similarly to stages 304-306 of the method 300.

In the fourth stage 404, a representation of the discovered devices for each logical control unit is created in, for example, a control block that represents every new logical CU and device image. Stages 402 through 404 are repeated for each logical control unit to be explored on each node 104.

In the fifth stage 405, appropriate paths are selected for the set of new logical control units that have been discovered. In one embodiment, channels 127 or other communication paths are selected from the list of possible paths (discovered in stages 403-404 and stored in the data collection in stage 305) that could be used to reach a new control unit 116. In one embodiment, the host system 102 or channel subsystem 112 is configured to utilize the configuration information to identify multiple separate communication paths between any given host computer and device entity, so that if one path to a device or control unit is lost, another path can be selected to effect communication. When an I/O operation is to be performed for a selected device 114, the computer system 102 and/or channel subsystem 112 may determine the best channel 127 or other communication path to use for executing the operation. During path selection, analysis is performed so that the set of paths chosen are selected to provide high availability. As a part of this analysis, consideration is given to ensure that, if possible, not all paths share the same switches or other network devices. This stage is performed for each target device 114 or control unit 116 in the cluster. In one embodiment, path selection may be automatically performed based on selected or pre-configured considerations for availability. In one embodiment, the path selection is performed for each host processor 102, and paths (e.g., static and/or dynamic or managed paths) are created for each host processor 102 so that the newly discovered logical control units and devices are accessible to each host processor 102. In one embodiment, the host processors 102 are part of a cluster that is managed by a Dynamic Channel Path Management (DCM) system that includes both static channels, and managed channels that can be re-assigned between selected I/O clusters. In this embodiment, identification data includes a Channel Path ID (CHPID) for each logical control unit.

In the sixth stage 406, identification data is generated for each logical control unit and device discovered. For example, addresses are created, such as device and control unit numbers, for devices and control units that have been discovered. The numbers may be selected based on a pre-existing configuration naming system.

In one embodiment, for DCM systems, stage 406 includes creating or using a policy that establishes a desired level of connectivity between host processors 102 and logical control units level of connectivity (i.e., the number of CHPIDS, static and managed). A number of static and/or managed channels to each logical control unit may be selected via the DCM system to create the level of connectivity desired. An example of a DCM system is described in U.S. Pat. No. 6,598,069, issued Jul. 22, 2003, which is hereby incorporated herein by reference in its entirety.

The systems and methods described herein provide numerous advantages over prior art dataflow systems. Technical effects and benefits include allowing for dynamic and automated discovery of physical and logical devices, such as control units, in a network or cluster. Using the exploration methods described herein allows for dynamic discovery of hardware in a clustered environment. Once discovery is complete, a consistent configuration can be used by the cluster, and can be utilized to automatically create and update network configurations and optimize system operation. The systems and methods allows for paths not currently used to be adopted, where prior approaches required manual effort and human knowledge to add new paths to control units. Other advantages include ensuring that communication paths chosen for various I/O operations are to the correct control units, and allowing paths to be chosen with availability considerations and minimal human interaction. In addition, each node in the network or cluster may use this automatic path selection, minimizing the manual effort in selecting communication paths to I/O devices.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for processing communications between a host processor and a plurality of devices connected to the host processor by an input/output processing system, comprising a non-transitory storage medium readable by a processing circuit and storing instructions for execution by the processing circuit for performing a method comprising:

receiving, by the host processor, physical configuration information including identification of a location of each physical endpoint connected to the host processor and a plurality of communication paths associated with each physical endpoint, wherein the host processor includes a Dynamic Channel Path Management (DCM) cluster;

iteratively interrogating, by the host processor, each physical endpoint by sending at least one message to each physical endpoint on each of the plurality of communication paths in response to receiving the physical configuration information, the at least one message requesting identification of a logical entity at the endpoint, and receiving logical configuration information identifying the logical entity;

generating a data collection accessible by the host processor, the data collection including the physical configuration information and the logical configuration information for each logical entity, and identification of the plurality of communication paths to each logical entity; and selecting one or more paths of the plurality of communication paths based on path availability for executing an input/output (I/O) operation, wherein selecting includes creating a host policy for determining a number of static paths for availability and a number of managed paths for performance to be associated with each logical entity.

2. The computer program product of claim 1, wherein the host processor is connected to the plurality of devices via a plurality of channels, and the at least one message is a Fibre Channel protocol message.

3. The computer program product of claim 2, wherein the at least one message includes at least one of a Test Initialization Capability (TINC) command configured to request an identification of each subchannel associated with a logical controller at the endpoint, and a message configured to request logical configuration information for each subchannel.

4. The computer program product of claim 1, wherein the host processor and the plurality of devices are connected via a network, and receiving physical configuration information includes sending a request message from the host processor to a network processor requesting a configuration of a plurality of physical endpoints in the network, and receiving the physical configuration information from the network processor in response to the request message.

5. The computer program product of claim 4, wherein the request message includes one of a Request Node Identification (RNID) message, a GID_FT (get port identifiers) message and a GA_NXT (get all next) command, and the at least one message includes a Test Initialization Capability (TINC) command configured to request an identification of each subchannel associated with a logical controller at the endpoint.

6. The computer program product of claim 5, wherein the at least one message includes at least one device-specific input/output (I/O) command, the I/O command configured to request characteristics of one or more devices associated with the logical controller.

7. The computer program product of claim 6, wherein the device-specific I/O command is selected from at least one of a sense identification command and a Read Configuration Data (RCD) command.

8. The computer program product of claim 1, wherein the method further comprises comparing the data collection to pre-existing configuration data including a configuration of entities in the network, identifying new entities, and updating the pre-existing configuration data.

9. The computer program product of claim 8, wherein updating the pre-existing configuration data includes selecting device numbers and control unit numbers based on availability of the numbers in the existing configuration, and selecting the device numbers and control unit numbers based on a type of I/O device.

10. The computer program product of claim 1, wherein the method further comprises generating an exploration device by configuring at least one of hardware and software in the host computer, the exploration device configured to be used to send the at least one message.

11. A method of processing communications between a host computer and a plurality of devices connected to the host computer by an input/output processing system, the method comprising:

receiving, by the host processor, physical configuration information including identification of a location of each physical endpoint connected to the host processor and a plurality of communication paths associated with each physical endpoint, wherein the host processor includes a Dynamic Channel Path Management (DCM) cluster;

iteratively interrogating, by the host processor, each physical endpoint by sending at least one message to each physical endpoint on each of the plurality of communication paths in response to receiving the physical configuration information, the at least one message requesting identification of a logical image at the endpoint, and receiving logical image configuration information identifying the logical entity; and generating a data collection accessible by the host processor, the data collection including the physical configuration information and the logical configuration information for each logical entity, and identification of the plurality of communication paths to each logical entity; and selecting one or more paths of the plurality of communication paths based on path availability for executing an input/output (I/O) operation, wherein selecting includes creating a host policy for determining a number of static paths for availability and a number of managed paths for performance to be associated with each logical entity.

12. The method of claim 11, wherein the host processor is connected to the plurality of devices via a plurality of channels, and the at least one message is a Fibre Channel protocol message.

13. The method of claim 12, wherein the at least one message includes a Test Initialization Capability (TINC) command configured to request an identification of each subchannel associated with a logical controller at the endpoint.

14. The method of claim 13, wherein the at least one message includes at least one device-specific input/output (I/O) command configured to request characteristics of a device associated with each subchannel.

15. The method of claim 11, wherein the host processor and the plurality of devices are connected via a network, and receiving physical configuration information includes sending a request message from the host processor to a network processor requesting a configuration of a plurality of physical endpoints in the network, and receiving the physical configuration information from the network processor in response to the request message.

16. The method of claim 15, wherein the request message includes one of a Request Node Identification (RNID) message, a GID_FT (get port identifiers) message and a GA_NXT (get all next) command, and the at least one message includes a Test Initialization Capability (TINC) command configured to request an identification of each subchannel associated with a logical controller at the endpoint.

17. The method of claim 11, further comprising comparing the data collection to pre-existing configuration data including a configuration of entities in the network, identifying new entities, and updating the pre-existing configuration data.

18. The method of claim 11, further comprising generating an exploration device by configuring at least one of hardware and software in the host computer, the exploration device configured to be used to send the first and the second message.

19. A computer program product for processing communications between a host processor and a plurality of devices connected to the host processor by a network, comprising a non-transitory storage medium readable by a processing circuit and storing instructions for execution by the processing circuit for performing a method comprising:

generating an exploration device by configuring at least one of hardware and software in the host processor, the exploration device configured to be used to communicate with one of a plurality of physical endpoints in the network, the host processor including a Dynamic Channel Path Management (DCM) cluster;

responsive to a connection between the host processor and the plurality of devices being a network connection, sending a first Fibre Channel message from a channel subsystem in the host computer to a network processor requesting a configuration of the plurality of physical endpoints;

receiving physical configuration information from the network processor in response to the first message, the physical configuration information including identification of a location and a plurality of channel paths associated with each I/O device;

iteratively interrogating, by the host processor, each physical endpoint by sending a second Fibre Channel message to one or more I/O devices on each of the plurality of channel paths in response to receiving the physical configuration information, the second Fibre Channel message requesting identification of a logical image connected to the plurality of channel paths, and receiving logical information identifying the logical image;

generating a data collection accessible by the host computer, the data collection including the physical configuration information and the logical information for each channel path, and identification of the plurality of channel paths to each logical control unit and selecting one or more paths of the plurality of communication paths based on path availability for executing an input/output (I/O) operation, wherein selecting includes creating a host policy for determining a number of static paths for availability and a number of managed paths for performance to be associated with each logical entity.

20. The computer program product of claim 19, wherein the method further comprises selecting one or more paths of the multiple paths based on path availability for executing an input/output (I/O) operation.

21. The computer program product claim 19, wherein the method further comprises comparing the data collection to pre-existing configuration data including a configuration of entities in the network, identifying new entities, and updating the pre-existing configuration data.

* * * * *